(12) United States Patent
Gibbons et al.

(10) Patent No.: US 10,427,562 B2
(45) Date of Patent: Oct. 1, 2019

(54) VEHICLE SEATING ASSEMBLY HAVING EXTENDABLE HEADREST PANEL

(71) Applicant: Ford Global Technologies, LLC, Dearborn, MI (US)

(72) Inventors: Robert Gibbons, Southfield, MI (US); Jeffrey Tien Vo, Southfield, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/678,293

(22) Filed: Aug. 16, 2017

(65) Prior Publication Data
US 2019/0054846 A1    Feb. 21, 2019

(51) Int. Cl.
| | | |
|---|---|---|
| *B60N 2/36* | (2006.01) | |
| *B60N 2/30* | (2006.01) | |
| *B60N 2/809* | (2018.01) | |
| *B60N 2/879* | (2018.01) | |
| *B60N 2/80* | (2018.01) | |
| *B60N 2/90* | (2018.01) | |

(52) U.S. Cl.
CPC ........... *B60N 2/36* (2013.01); *B60N 2/30* (2013.01); *B60N 2/80* (2018.02); *B60N 2/809* (2018.02); *B60N 2/879* (2018.02); *B60N 2002/363* (2013.01); *B60N 2002/905* (2018.02)

(58) Field of Classification Search
CPC .......... B60N 2/36; B60N 2/879; B60N 2/809; B60N 2/30; B60N 2002/905; B60N 2002/363
See application file for complete search history.

(56) References Cited

U.S. PATENT DOCUMENTS

| | | | | |
|---|---|---|---|---|
| 5,370,060 | A | * 12/1994 | Wang | B60N 3/004 108/149 |
| 6,089,641 | A | * 7/2000 | Mattarella | B60N 2/3011 296/64 |
| 6,129,404 | A | 10/2000 | Mattarella et al. | |
| 6,540,295 | B1 | * 4/2003 | Saberan | B60N 2/206 297/283.3 |
| 6,648,395 | B2 | 11/2003 | Hoshino | |
| 6,817,660 | B2 | * 11/2004 | Ito | B60N 2/3013 296/65.09 |
| 6,860,550 | B2 | * 3/2005 | Wojcik | B60N 2/206 108/44 |
| 7,044,550 | B2 | 5/2006 | Kim | |

* cited by examiner

*Primary Examiner* — Philip F Gabler
(74) *Attorney, Agent, or Firm* — Vichit Chea; Price Heneveld LLP (57) ABSTRACT

A vehicle is provided herein. The vehicle includes a first seating assembly and a second seating assembly. The first seating assembly is positioned vehicle rearward of the second seating assembly and is comprised of a seatback pivotally coupled to a seat-base, a headrest coupled to the seatback via a connecting feature, and a panel assembly coupled to the connecting feature. The seatback is operable between a folded position and an unfolded position. The panel assembly is configured to protrude vehicle forward of the headrest when the seatback is in the folded position.

8 Claims, 10 Drawing Sheets

VEHICLE SEATING ASSEMBLY HAVING EXTENDABLE HEADREST PANEL

FIELD OF THE INVENTION

The present disclosure generally relates to vehicles and, more particularly, to vehicle seating assemblies.

BACKGROUND OF THE INVENTION

Automotive vehicles are commonly equipped with rows of seating. The rows of seating typically include seating assemblies that are forwardly-foldable to optimize cargo space within the vehicle. In some cases, when seating assemblies are folded forward, cargo may topple into gaps that exist between the rows of seating assemblies. Additionally, cargo that is placed on the rear-side of a headrest of a forwardly-folded seating assembly may damage the exterior of the headrest.

SUMMARY OF THE INVENTION

According to one aspect of the present disclosure, a vehicle includes a first seating assembly and a second seating assembly positioned vehicle forward of the first seating assembly. The first seating assembly is comprised of a seatback pivotally coupled to a seat-base, a headrest coupled to the seatback via a connecting feature, and a panel assembly coupled to the connecting feature. The seatback is operable between a folded position and an unfolded position. The panel assembly is configured to protrude vehicle forward of the headrest when the seatback is in the folded position.

Embodiments of the first aspect of the invention can include any one or a combination of the following features:
  the panel assembly comprises a first panel from which a second panel is configured to translate;
  the second panel is configured to translate toward the second seating assembly when the seatback is in the folded position;
  the vehicle further comprises a locking feature coupled to the panel assembly that resists translation of the second panel relative to the first panel;
  the second panel is configured to translate telescopically relative to the first panel;
  the vehicle further comprising a biasing member coupled to the second panel configured to bias the second panel outwardly from the first panel;
  the vehicle further comprising at least one post, wherein the panel assembly is coupled to the at least one post; and
  the panel assembly is generally rotationally fixed in relation to the headrest.

According to another aspect of the present disclosure, a vehicle seating assembly includes a seatback pivotally coupled to a seat-base. A headrest is coupled to the seatback by a connecting feature. A panel assembly is coupled to the connecting feature. The panel assembly extends to a position forward of the headrest when the seatback is in a forwardly-folded position.

Embodiments of the second aspect of the invention can include any one or a combination of the following features:
  the panel assembly is substantially planar to the seatback;
  the panel assembly comprises a first panel and a second panel configured to extend from the first panel;
  the assembly further comprising a locking feature coupled to the panel assembly that resists at least one of an extension and a contraction of the second panel relative to the first panel;
  the second panel is configured to extend telescopically relative to the first panel;
  the assembly further comprising at least one post, wherein the panel assembly is coupled to the at least one post;
  the assembly further comprising a snap-fit feature coupling the panel assembly to the at least one post; and
  the assembly further comprising a clip-on feature coupling the panel assembly to the at least one post.

According to yet another aspect of the present disclosure, a method of operating a vehicle includes the steps of coupling a panel assembly, comprising a first panel and a second panel, to a headrest of a first seating assembly, folding a seatback of the first seating assembly in the vehicle forward direction, and translating the second panel from the first panel to a position vehicle forward of the headrest.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-6, reference numeral 10 generally designates a vehicle, such as a wheeled motor vehicle. The vehicle 10 includes a first seating assembly 14A and a second seating assembly 14B that is positioned vehicle forward of the first seating assembly 14A. The first seating assembly 14A is comprised of a seatback 22 pivotally coupled to a seat-base 18, a headrest 30 coupled to the seatback via a connecting feature 26, and a panel assembly 34 coupled to the connecting feature 26. The seatback 22 is operable between a folded position and an unfolded position. The panel assembly 34 is configured to protrude vehicle forward of the headrest 30 when the seatback 22 is in the folded position.

Figure 1:
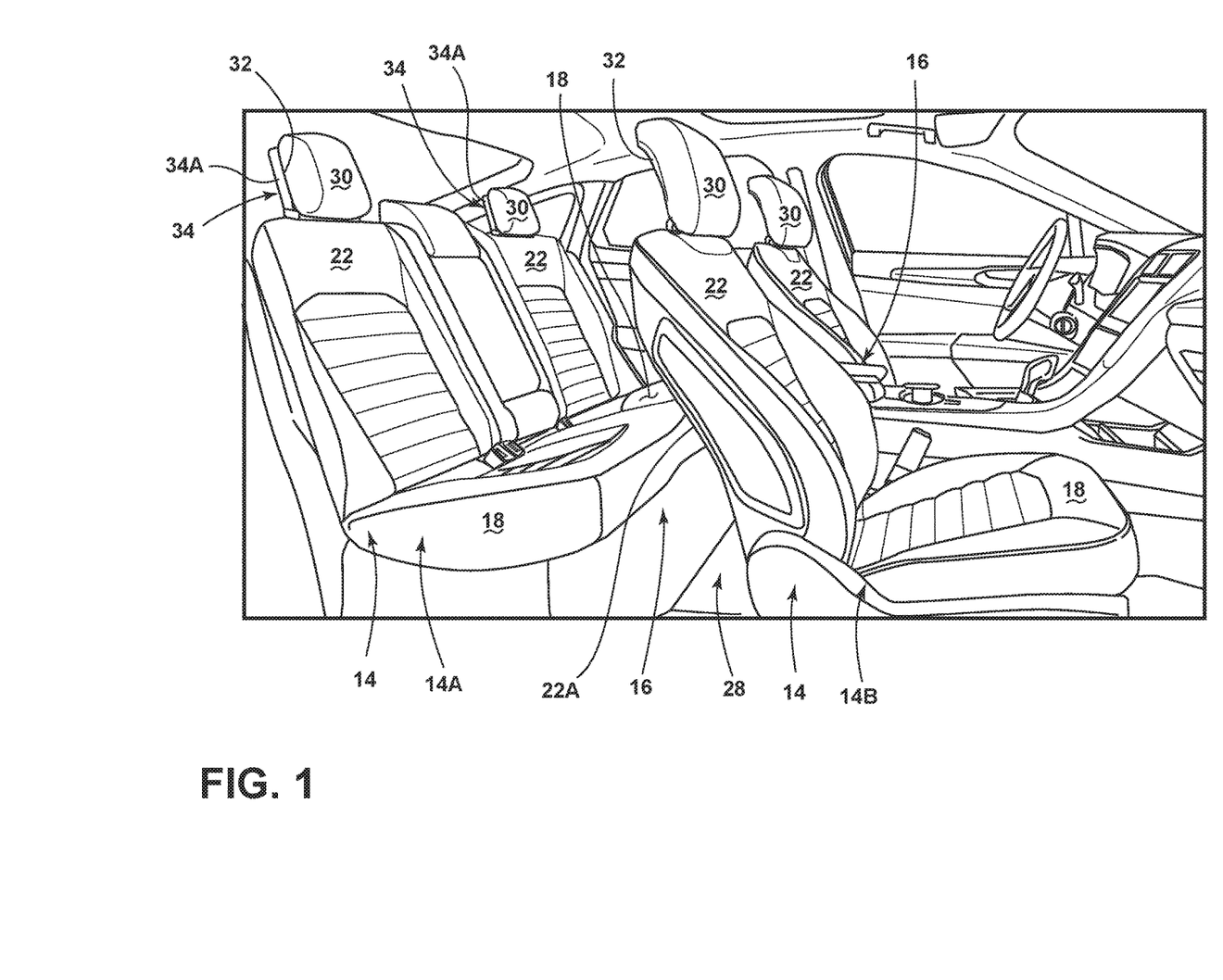
FIG. 1 is a perspective view of a vehicle interior equipped with multiple rows of seating assemblies, according to one embodiment.

Referring to FIG. 1, the vehicle 10 has a plurality of seating assemblies 14 arranged in rows 16. The rows 16 of seating assemblies 14 may be configured as bench seats and/or bucket seats. The rows 16 of seating assemblies 14 exemplified in FIG. 1 are oriented in the vehicle forward direction. However, in light of the emergence of autonomous vehicles, which can be oriented without traditionally configured rows 16 of seating, it will be understood that the features of this invention are still applicable in the absence of such rows 16. There may be a plurality of gaps 28 between the rows 16.

At least one row 16 of seating may include at least one first seating assembly 14A, and another row 16 of seating may include at least one second seating assembly 14B that is positioned vehicle forward of the at least one first seating assembly 14A. Each seating assembly 14 includes the seat-base 18 and the seatback 22. The seatback 22 includes a rear-side 22A and is pivotally coupled to the seat-base 18, such that the seatback 22 may pivot or fold from an unfolded position to a folded position. In other words, the seatback 22 is operable to pivot relative to the seat-base 18 between an upright, substantially vertical position and a forwardly-folded, substantially horizontal position. This forward folding of the seatback 22 serves a multitude of purposes, including increasing trunk space for cargo that may be placed on the seatback 22.

In some embodiments, the seating assembly 14 may include the headrest 30, which includes a headrest rear-side 32. The headrest 30 may be coupled to the seatback 22. In some embodiments, the seating assembly 14 may include a connecting feature 26 that couples the headrest 30 to the seatback 22. In some embodiments, the connecting feature 26 may include at least one post. In some embodiments, the headrest 30 may be integrally formed with the seatback 22.

The seating assembly 14 may include the panel assembly 34 connected thereto. The panel assembly 34 may include a first panel 34A and/or a second panel 34B. It is contemplated that, in some embodiments, the panel assembly 34 may include only the first panel 34A or only the second panel 34B. Additionally, in some embodiments, the panel assembly 34 may include multiple first panels 34A and/or multiple second panels 34B.

The panel assembly 34 may be coupled to the headrest 30 and employed when the seatback 22 is in the folded position to cover the gaps 28 between rows 16 of seating. In some embodiments, the panel assembly 34 may be coupled to the connecting feature 26. The panel assembly 34 may be coupled to the headrest 30 and/or the connecting feature 26 by an adhesive, hook and loop (e.g. Velcro®), magnet, tab, clip, hook, snap, tie, and/or a combination thereof. In some embodiments, the panel assembly 34 may be integrally formed with the headrest 30 and/or the connecting feature 26. In some examples, in which the connecting feature 26 includes at least one post, the panel assembly 34 may be coupled to the at least one post by a clip-on feature 36 and/or a snap-fit feature 38, as is depicted in FIGS. 2A and 2B respectively.

Figure 2:
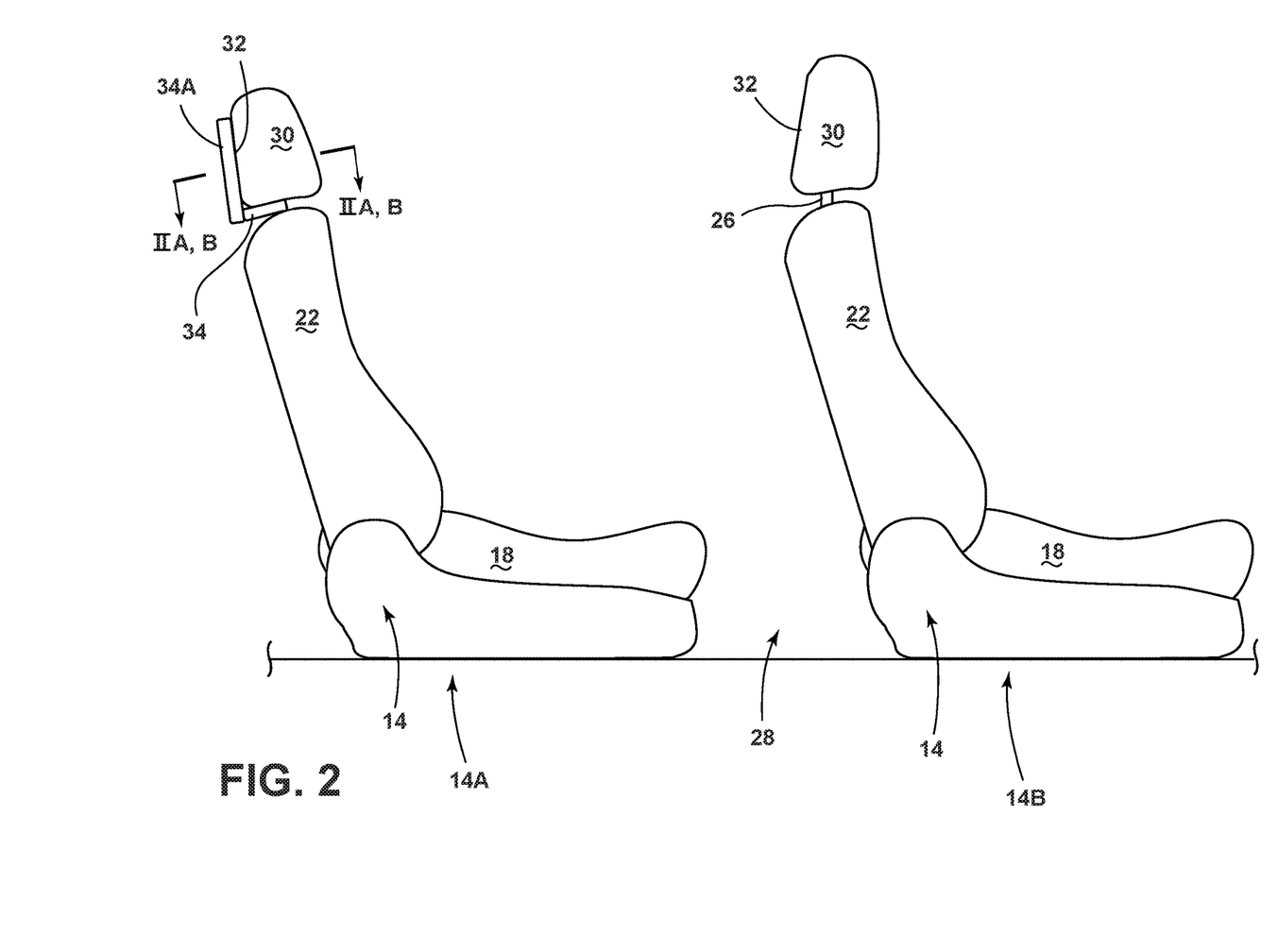
FIG. 2 is a side elevational view of the vehicle interior illustrating a panel assembly coupled to a headrest and/or a connecting feature, according to one embodiment.
Figure 2A:
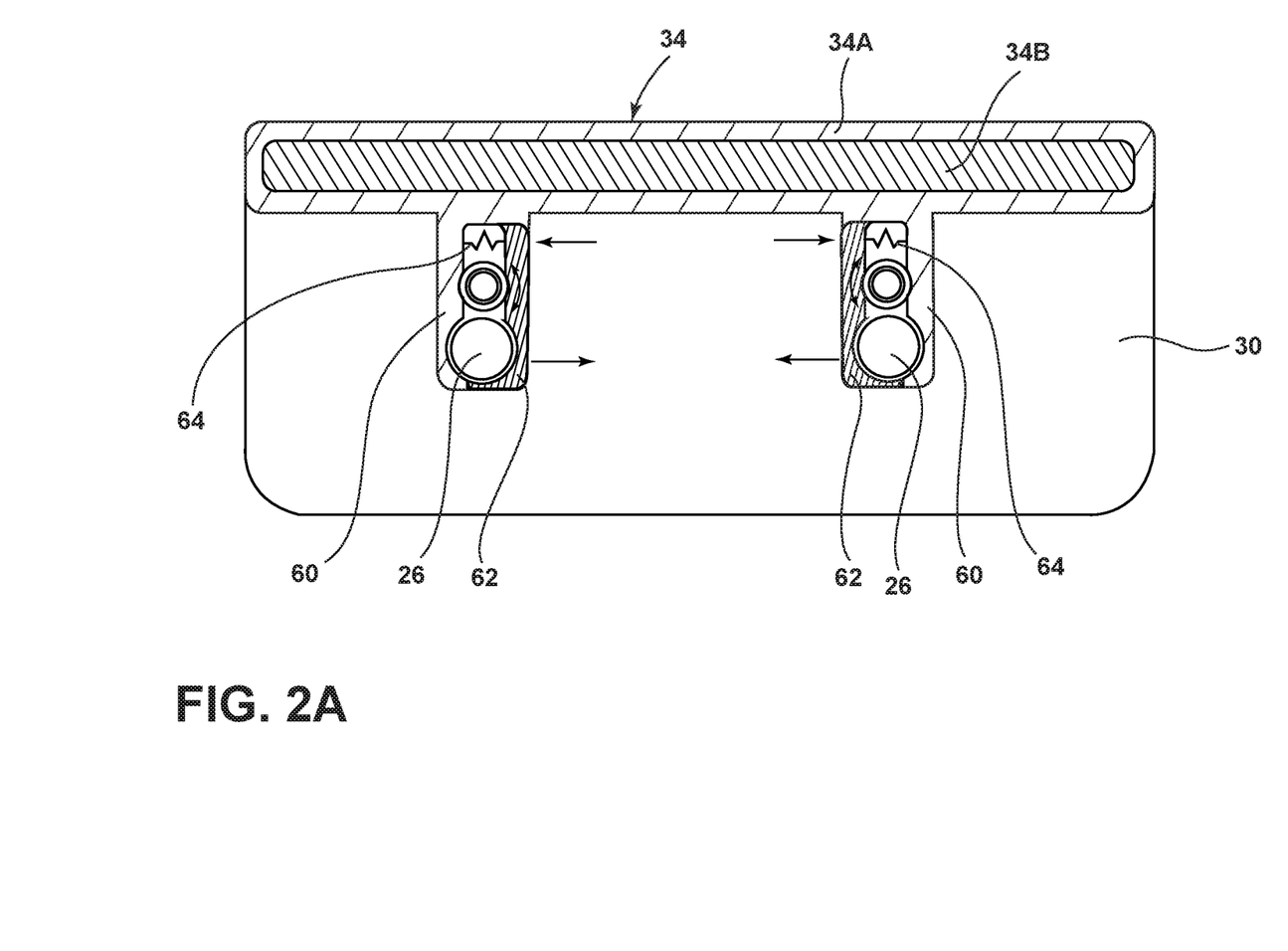
FIG. 2A is a cross-sectional view taken through line IIA-IIA of FIG. 2 with the panel assembly coupled to the connecting feature by a clip-on feature.

Referring now to FIG. 2A, the clip-on feature 36 may be attached to and/or integrally formed with the panel assembly 34 and may include a fixed jaw 60, a pivoting jaw 62, and a spring 64 according to one embodiment. The spring 64 may be disposed between the fixed jaw 60 and the pivoting jaw 62 and may bias the distal end of the pivoting jaw 62 toward the distal end of the fixed jaw 60 to create a pincer. In operation, a user may (1) compress the spring 64 to open the pincer, (2) place the post of the connecting feature 26 within the opened pincer, and then (3) stop compressing the spring 64 to allow the pivoting jaw 62 to close the post of the connecting feature 26 between the pivoting jaw 62 and the fixed jaw 60.

Figure 2B:
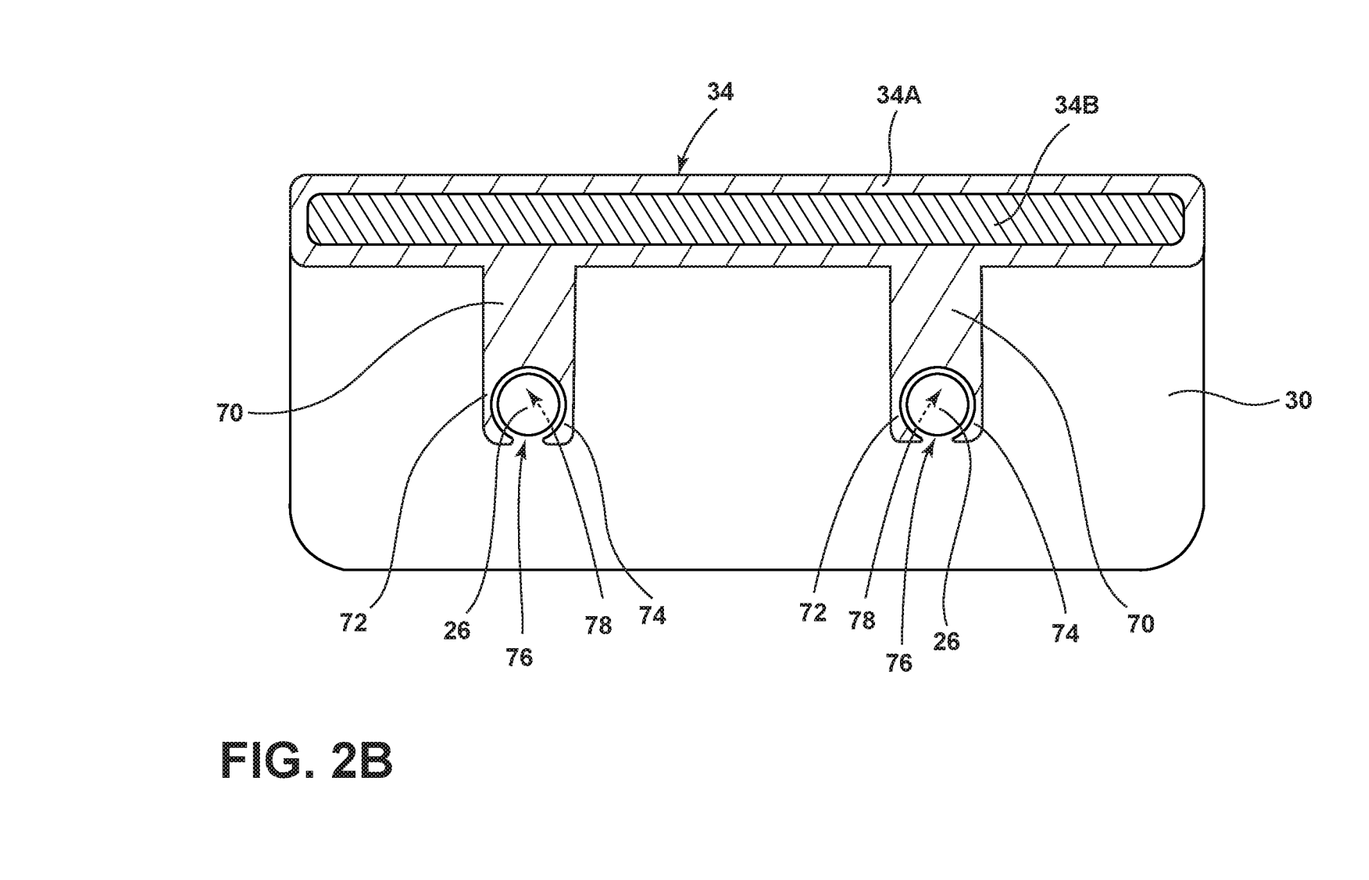
FIG. 2B is a cross-sectional view taken through line IIB-IIB of FIG. 2 with the panel assembly coupled to the connecting feature by a snap-fit feature.

Referring now to FIG. 2B, the snap-fit feature 38 may be attached to and/or integrally formed with the panel assembly 34 and may include an arm 70 having a first flange 72 and a second flange 74 that define a relatively narrow opening 76 that leads to a relatively larger recess 78. The first flange 72 and/or second flange 74 may be composed of flexible yet resilient material. In operation, the user may align the narrow opening 76 with the post of the connecting feature 26 and push the post of the connecting feature 26 into the narrow opening 76 such that the first flange 72 and/or second flange 74 temporarily deforms to allow the post of the connecting feature 26 to enter into the larger recess 78. After the post is within the larger recess 78, the first flange 72 and/or the second flange 74 may become un-deformed and retain the post within the larger recess 78.

The panel assembly 34 may be generally rotationally fixed in relation to the headrest 30 while the panel assembly 34 is coupled to the headrest 30 and/or the connecting feature 26. Additionally, the first panel 34A and/or the second panel 34B may be generally rotationally fixed in relation to the headrest 30 while the panel assembly 34 is coupled to the headrest 30 and/or the connecting feature 26.

The components of the panel assembly 34 may be composed of a rigid material and/or a flexible material. Accordingly, the first panel 34A and/or the second panel 34B may be composed of plastic, natural materials, metal, rubber, fabric, cloth, mesh, netting and/or a combination thereof. Additionally, components of the panel assembly 34 may be composed of the same material as the exterior portion of the headrest 30, to which the panel assembly 34 is coupled. For example, if the exterior of the headrest 30 is composed of leather, the components of the panel assembly 34 may likewise be composed of leather, either in part or entirely.

The first panel 34A and/or the second panel 34B may be a generally rectangular prism. However, it is contemplated that the first panel 34A and the second panel 34B may be any suitable shape. Additionally, first panel 34A and the second panel 34B may have similar or different shapes. If the first panel 34A and/or the second panel 34B are flexible, the first panel 34A and/or the second panel 34B may take various forms. The first panel 34A and/or the second panel 34B may be the shape of the headrest rear-side 32 and/or mimic the contours of the headrest rear-side 32.

In reference to FIGS. 2A-B, 3-3D, and 5-6, the second panel 34B may extend from the first panel 34A. The second panel 34B may extend from, and contract towards, the first panel 34A in any conceivable way that would be known to a person having ordinary skill in the art. For example, the second panel 34B may extend and contract relative to the first panel 34A, in a manner similar to opening a book and closing a book, by utilizing a hinge that couples the first panel 34A to the second panel 34B. In some embodiments, the second panel 34B may extend and contract relative to the first panel 34A, in a manner similar to a jack-knife opening and closing, by utilizing a swivel that couples the first panel 34A to the second panel 34B. In some embodiments, the second panel 34B may extend and contract relative to the first panel 34A by stretching, unfolding, unrolling, and/or unfurling.

Figure 3:
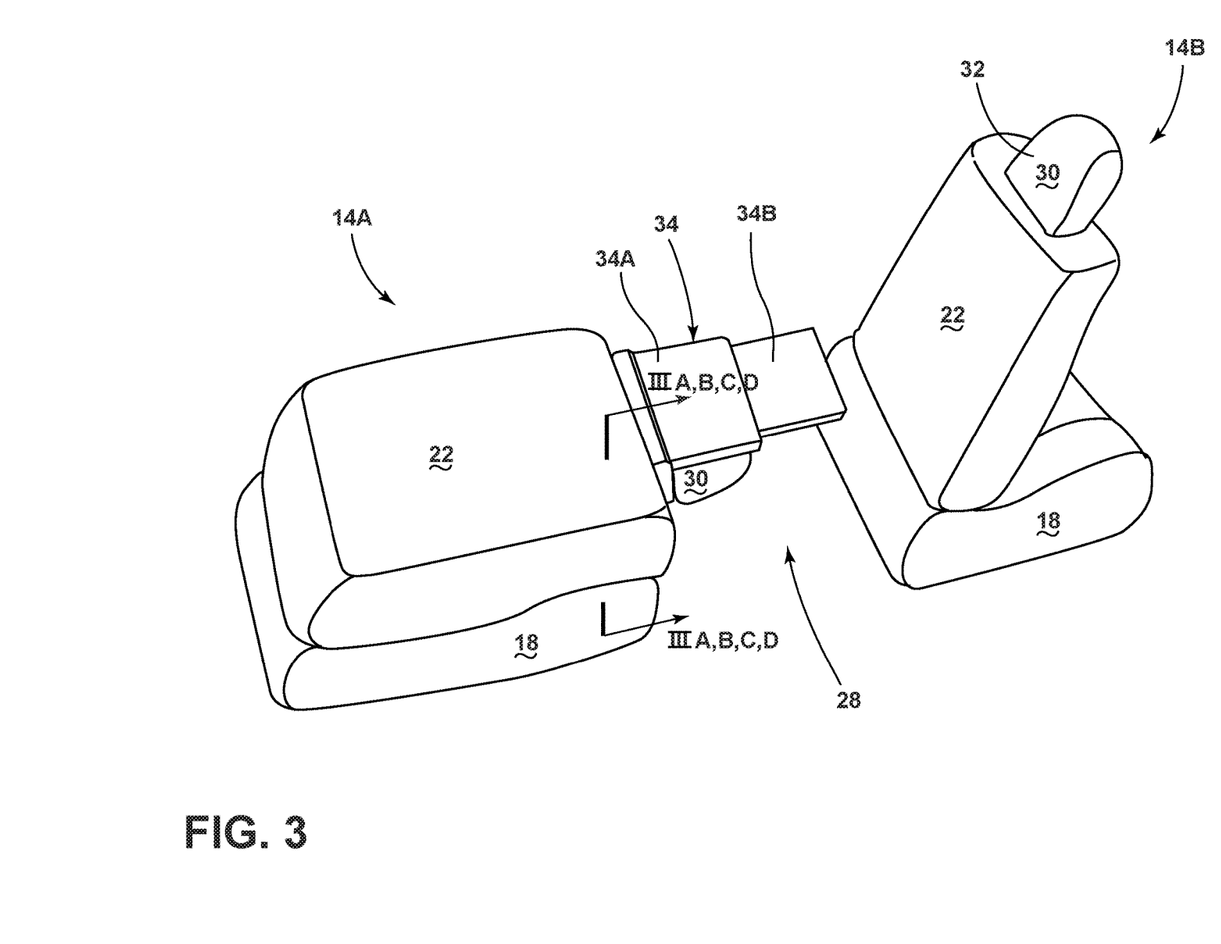
FIG. 3 is a rear perspective view of the seating assemblies illustrating a second panel extending from a first panel of the panel assembly coupled to the headrest and/or connecting feature of a first seating assembly, according to one embodiment.
Figure 3A:
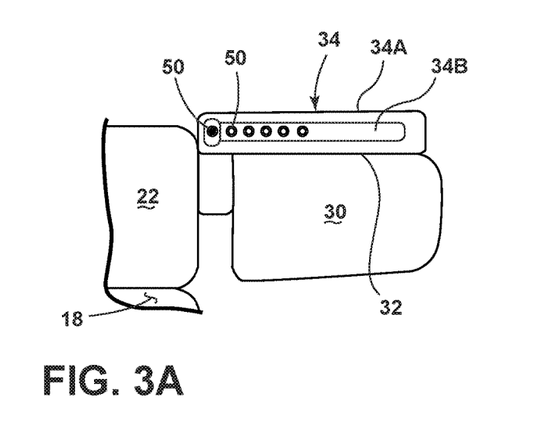
FIG. 3A is a cross-sectional view taken through line IIIA-IIIA of FIG. 3 with the panel assembly in a retracted position.
Figure 3B:
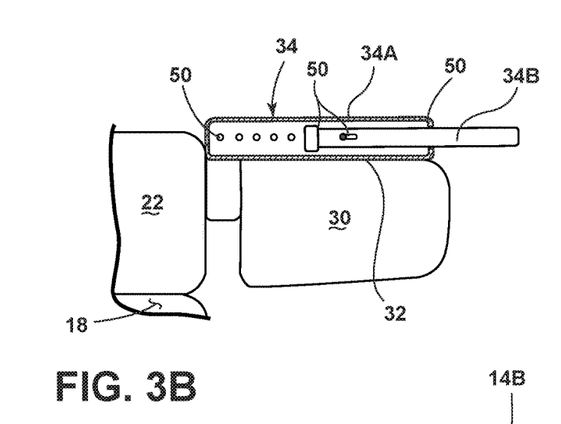
FIG. 3B is cross-sectional view taken through line IIIB-IIIB of FIG. 3 with the panel assembly in an extended position.

As depicted in FIGS. 3A-B, the second panel 34B may extend from, and contract towards, the first panel 34A via translation. In some examples, the second panel 34B translates along a path that is about parallel to the first panel 34A and/or the headrest rear-side 32.

In some embodiments, the second panel 34B may extend and contract translationally relative to the first panel 34A by utilizing wheels that roll along a track. In some embodiments, the second panel 34B may extend and contract translationally relative to the first panel 34A by sliding along grooves of the second panel 34B and/or the first panel 34A. It is contemplated that various other structures known to a person having ordinary skill in the art may be utilized to translate the second panel 34B relative to the first panel 34A.

The second panel 34B may be oriented relative to the first panel 34A in a multitude of ways. For example, the second panel 34B may be positioned atop, beneath, and/or side-by-side the first panel 34A. As depicted in FIGS. 2A-B and 3-3D, in some embodiments, the second panel 34B may be nested within a cavity 46 of the first panel 34A. In such embodiments, the second panel 34B may translate telescopically into and out of the cavity 46 of the first panel 34A in movements of contraction and extension, respectively.

It is contemplated that any number of panels beyond the second panel 34B may extend from the first panel 34A and/or the second panel 34B.

The first panel 34A and/or the second panel 34B may extend such that at least a portion of the first panel 34A and/or the second panel 34B is positioned vehicle forward of the headrest 30 when the seatback 22 is in the folded position. For example, the second panel 34B may extend from the first panel 34A such that a portion of the second panel 34B is positioned vehicle forward of the headrest 30 when the seatback 22 is in the folded position. In some examples, the first panel 34A and/or the second panel 34B of the panel assembly 34 may protrude vehicle forward of the headrest 30 when the seatback 22 is in the forwardly-folded position. In some examples, in which the panel assembly 34 is coupled to the first seating assembly 14A vehicle rearward of the second seating assembly 14B, while the first seating assembly 14A is in the folded position, the first panel 34A and/or the second panel 34B may extend to partially bridge the gap 28 between the first seating assembly 14A and the second seating assembly 14B. In such examples, the first panel 34A and/or the second panel 34B may additionally, or alternatively, extend to majorly, substantially, and/or completely bridge the gap 28. Further, in such examples, the first panel 34A and/or the second panel 34B may, additionally, contact or touch the second seating assembly 14B.

Figure 3C:
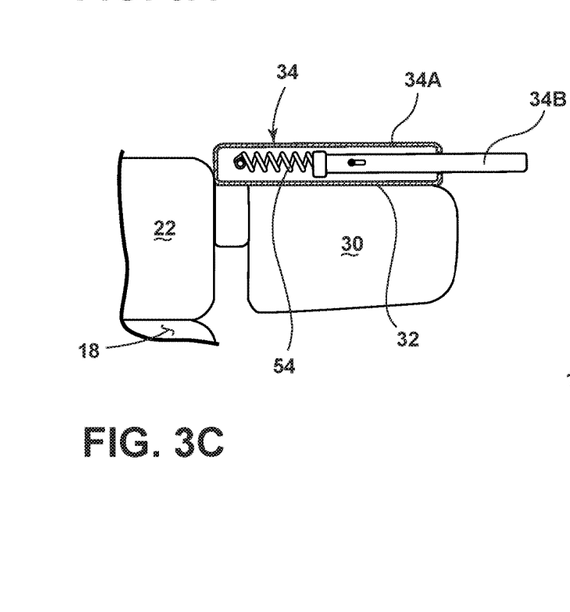
FIG. 3C is a cross-sectional view taken through line IIIC-IIIC of FIG. 3 with a biasing member coupled to the panel assembly.
Figure 3D:
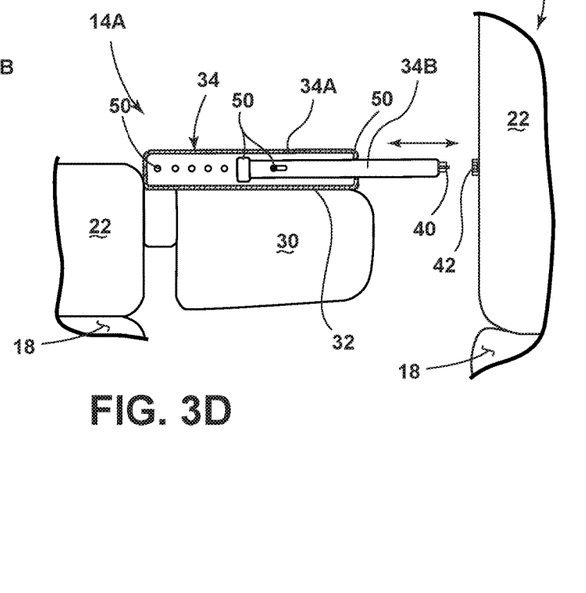
FIG. 3D is a cross-sectional view taken through line IIID-IIID of FIG. 3 with an attachment feature coupled to the panel assembly and a receiving feature coupled to a second seatback.

Referring now FIG. 3D, an attachment feature 40 may be coupled to the panel assembly 34 that is coupled to the first seating assembly 14A. In some embodiments, the attachment feature 40 may be coupled to the first panel 34A, and/or the second panel 34B. In some embodiments, the attachment feature 40 may be coupled to the distal end of the first panel 34A and/or the second panel 34B.

The attachment feature 40 may attach to a receiving feature 42 that is coupled to the second seating assembly 14B. The receiving feature 42 may be coupled to any component of the seating assembly 14. For example, the receiving feature 42 may be coupled to the seatback 22. In some embodiments, the receiving feature 42 may be coupled to the rear-side 22A of the seatback 22. In some embodiments, the receiving feature 42 may be coupled to the seat-base 18. The attachment feature 40 and/or the receiving feature 42 may be an adhesive, hook and loop (e.g. Velcro®), magnet, tab, clip, hook, snap, tie, zipper, button, and/or a combination thereof. The attachment feature 40 and/or the receiving feature 42 may be a feature configured to engage with an adhesive, hook and loop (e.g. Velcro®), magnet, tab, clip, hook, snap, tie, zipper, button, and/or a combination thereof.

Referring now to FIGS. 3A-D, a locking feature 50 may be coupled to the panel assembly 34 and may resist at least one of extension and contraction of the second panel 34B relative to the first panel 34A. The locking feature 50 may be coupled to the first panel 34A and/or the second panel 34B. The locking feature 50 may be a pin, detent, friction, lock, catch, dog, and/or a combination thereof. Further, it is contemplated that the locking feature 50 may be any suitable resistive feature or combination of features known to one having ordinary skill in the art. In some embodiments, the locking feature 50 may be configured to resist extension and/or contraction of the second panel 34B relative to the first panel 34, such that the second panel 34B is substantially fixed relative to the first panel 34A. In some embodiments, the locking feature 50 may be configured to yieldingly resist extension and/or contraction of the second panel 34B relative to the first panel 34A. In some embodiments, the locking feature 50 may be configured to both yieldingly resist extension and/or contraction of the second panel 34B relative to the first panel 34A and resist extension and/or contraction of the second panel 34B relative to the first panel 34A such that the second panel 34B is substantially fixed relative to the first panel 34A.

In some embodiments, the locking feature 50 may provide intermediate resistance by resisting an extension and/or a contraction of the second panel 34B relative to the first panel 34A when the second panel 34B is not fully extended or contracted relative to the first panel 34A. In some embodiments, the locking feature 50 may provide end-point resistance when the second panel 34B is either fully extended or fully contracted relative to the first panel 34A by resisting an over-extension and/or an over-contraction of the second panel 34B relative to the first panel 34A. In some embodiments, the locking feature 50 may provide both intermediate resistance and end-point resistance.

Referring now to FIG. 3C, a biasing member 54 is shown coupled to the second panel 34B and is configured to bias the second panel 34B to extend relative to the first panel 34A. The biasing member 54 may allow the second panel 34B to extend relative to the first panel 34A with minimal user effort, upon the user disengaging the locking feature 50. The biasing member 54 may be a spring, elastic band, pulley, electric motor, piston, and/or a combination thereof. It is contemplated that the biasing member 54 may be any suitable biasing feature or combination of features known to one having ordinary skill in the art.

Figure 7:
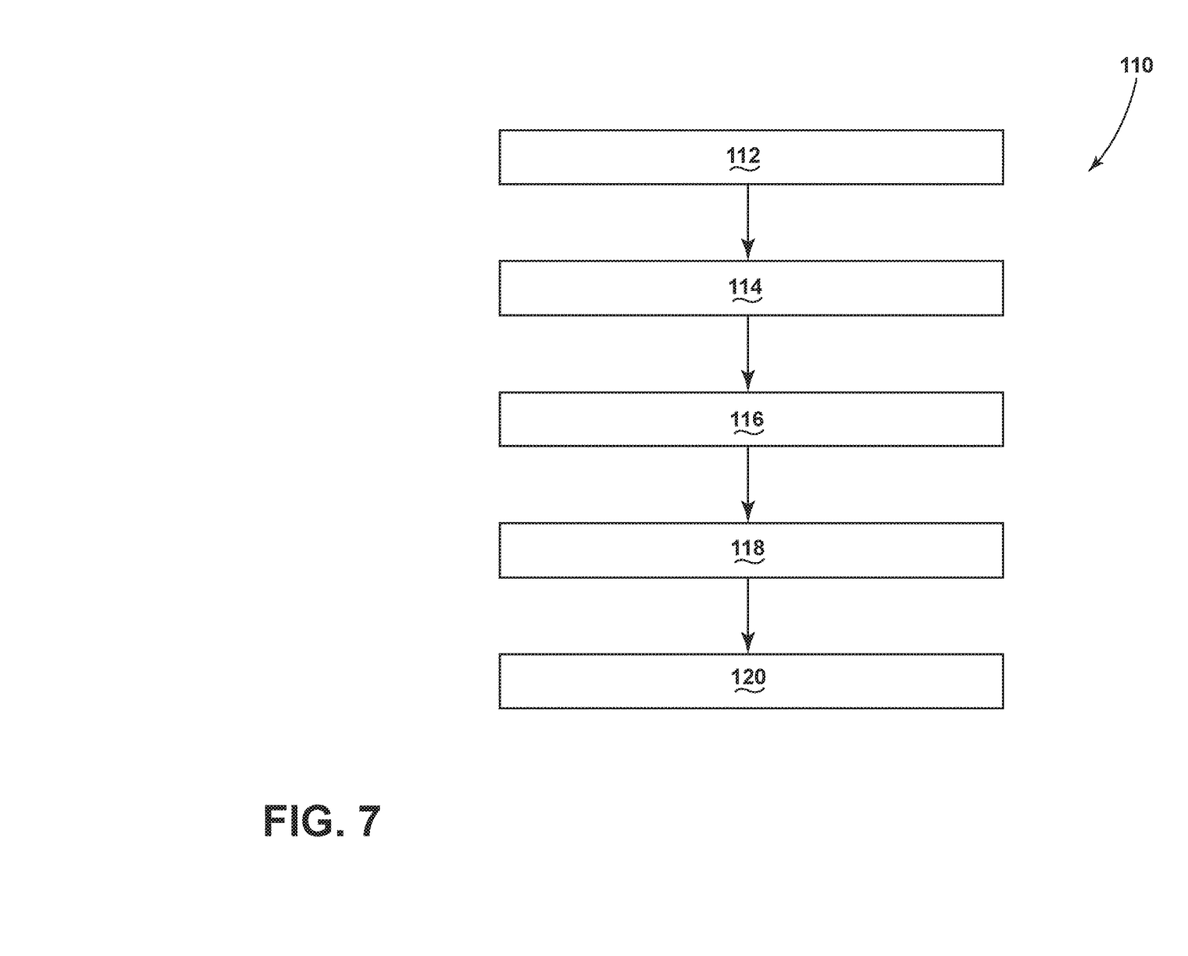
FIG. 7 is a flow chart of a method of configuring a vehicle seating arrangement, according to one embodiment.

In reference to FIG. 7, a method of configuring a seating arrangement in a vehicle 110 is disclosed. The method 110 includes the step 112 of coupling the panel assembly 34 to the first seating assembly 14A. The panel assembly 34 may include the first panel 34A and/or the second panel 34B. It is contemplated that, in some embodiments, the panel assembly 34 may include only the first panel 34A or only the second panel 34B. Additionally, in some embodiments, the panel assembly 34 may include multiple first panels 34A and/or multiple second panels 34B.

The first seating assembly 14A may include the seat-base 18, the seatback 22, the connecting feature 26, and/or the headrest 30. In some embodiments, the panel assembly 34 may be coupled to the headrest 30. In some embodiments, the panel assembly 34 may be coupled to the headrest rear-side 32. In some embodiments, the panel assembly 34 may be coupled to the connecting feature 26. In some embodiments, the panel assembly 34 may be coupled to any component of the first seating assembly 14A.

The panel assembly 34 may be coupled to the headrest 30, the connecting feature 26, and/or other components of the first seating assembly 14A by an adhesive, hook and loop (e.g. Velcro®), magnet, tab, clip, hook, snap, tie, zipper, button, and/or a combination thereof. In some examples, in which the connecting feature 26 includes at least one post, the panel assembly 34 may be coupled to the at least one post by the clip-on feature and/or the snap-fit feature, as is depicted in FIGS. 2A and 2B respectively. In some embodiments, the panel assembly 34 may be integrally formed with the headrest 30, the connecting feature 26, and/or other components of the first seating assembly 14A.

The method of configuring the seating arrangement in the vehicle 110 includes the step 114 of folding the first seating assembly 14A. The first seating assembly 14A may be folded by pivoting the seatback 22 relative to the seat-base 18. In other words, the first seating assembly 14A may be folded by folding the seatback 22.

In some examples, the seatback 22 may be folded in the vehicle forward direction. In other words, the seatback 22 may be pivoted relative to the seat-base 18 such that the distal end of the seatback 22 (relative to the axis that the seatback 22 is pivoting about) is directed towards the front of the vehicle 10. It is contemplated that the seatback 22 may be folded in any vehicular direction.

Figure 4:
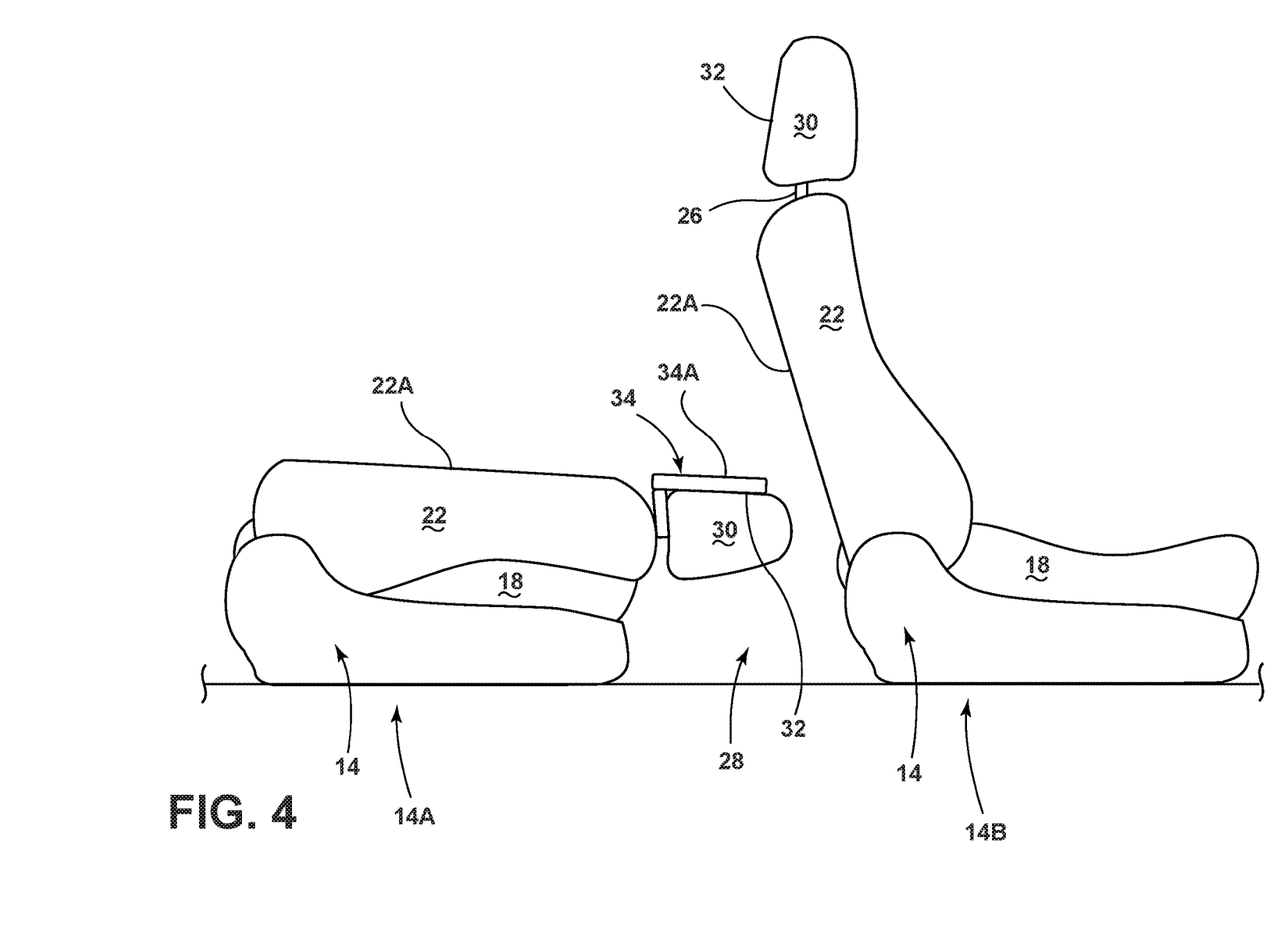
FIG. 4 is a side elevational view of the first and second seating assemblies with the panel assembly coupled to the first seating assembly in the folded position, according to one embodiment.
Figure 5:
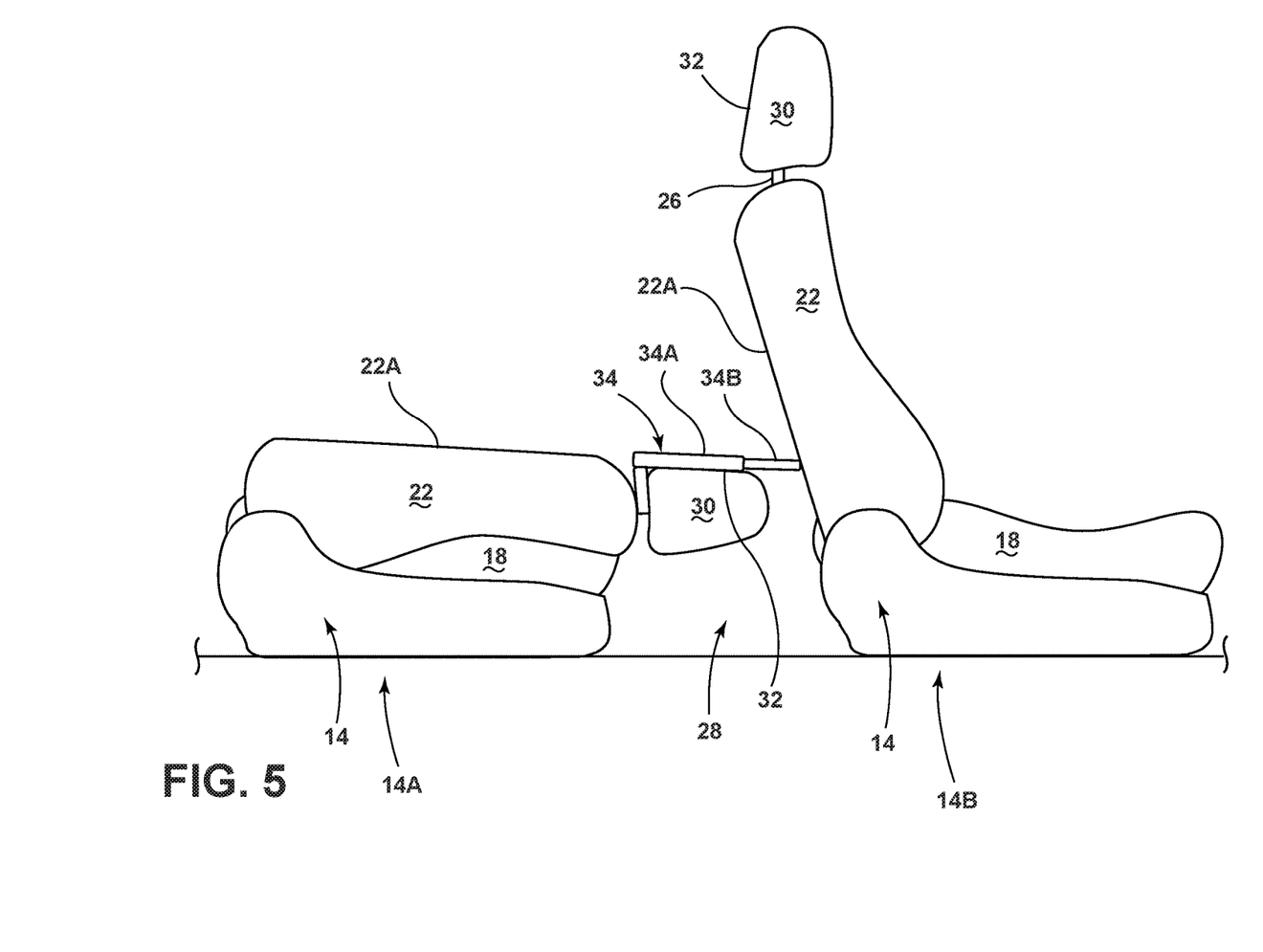
FIG. 5 is a side elevational view of the first and second seating assemblies with the extended panel assembly coupled to the folded first seating assembly, according to one embodiment.
Figure 6:
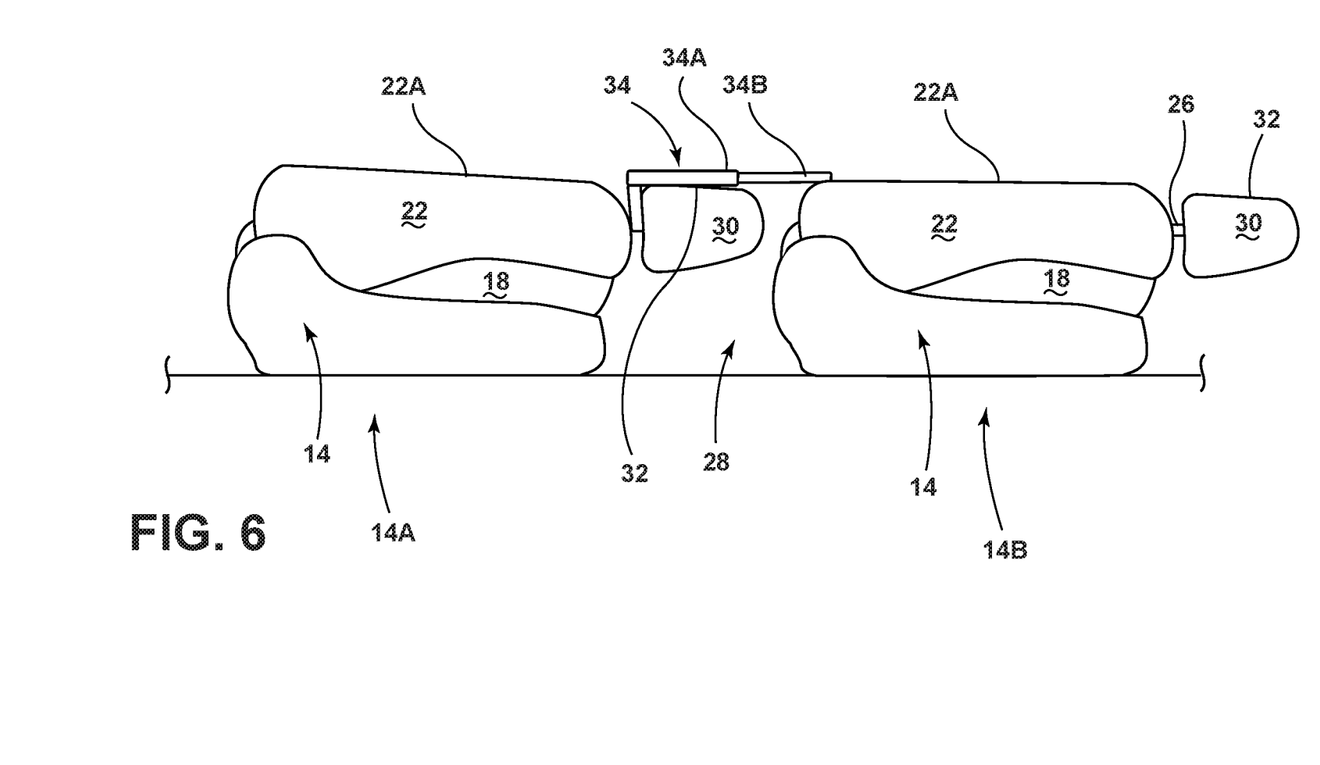
FIG. 6 is a side elevational view of the folded first and second seating assemblies with the extended panel assembly coupled to the first seating assembly, according to one embodiment.

In some examples, the seatback 22 may be folded in the seating assembly-forward direction. The seating assembly-forward direction may be the direction opposite the rear-side 22A of the seatback 22 when the seatback 22 is in an upright position. The second seating assembly 14B as shown in FIGS. 4-5, and both the first seating assembly 14A and the second seating assembly 14B as shown in FIG. 7 depict seatbacks 22 folded in the seating assembly-forward direction. It is contemplated that the first seating assembly 14A may be folded in any seating assembly direction.

The method of operating a vehicle 110 includes the step 116 of extending the second panel 34B from the first panel 34A. The second panel 34B may extend from, and contract towards, the first panel 34A in any conceivable way that would be known to a person having ordinary skill in the art. For example, the second panel 34B may extend and contract relative to the first panel 34, in a manner similar to opening a book and closing a book, by utilizing a hinge that couples the first panel 34A to the second panel 34B. In some embodiments, the second panel 34B may extend and contract relative to the first panel 34, in a manner similar to a jack-knife opening and closing, by utilizing a swivel that couples the first panel 34A to the second panel 34B. In some embodiments, the second panel 34B may extend and contract relative to the first panel 34A by stretching, unfolding, unrolling, and/or unfurling.

The second panel 34B may extend from, and contract towards, the first panel 34A via translation. In some embodiments, the second panel 34B may translate into and out of the cavity 46 in the first panel 34A telescopically in movements of contraction and extension respectively. In some examples, the second panel 34B translates along a path that is about parallel to the first panel 34A and/or the headrest rear-side 32.

In some embodiments, the second panel 34B may extend and contract translationally relative to the first panel 34A by utilizing wheels that roll along a track. In some embodiments, the second panel 34B may extend and contract translationally relative to the first panel 34A by sliding along grooves of the second panel 34B, and/or the first panel 34A. It is contemplated that various other structures known to a person having ordinary skill in the art could be utilized to translate the second panel 34B relative to the first panel 34A.

In some examples, the second panel 34B may extend from the first panel 34A such that a portion of the second panel 34B is positioned vehicle forward of the headrest 30. In some examples, the second panel 34B may extend from the first panel 34A such that a portion of the second panel 34B is positioned seating assembly-forward of the headrest 30. In some examples, the second panel 34B may extend from the first panel 34A such that the second panel partially bridges the gap 28 between the first seating assembly 14A and the second seating assembly 14B that is vehicle forward of the first seating assembly 14A. In such examples, the second panel 34B may additionally, or alternatively, extend to majorly, substantially, and/or completely bridge the gap 28.

The method of configuring the seating arrangement in the vehicle 110 includes the step 118 of contacting or, in other words, touching the second seating assembly 14B, which is vehicle forward of the first seating assembly 14A, with the first panel 34A and/or the second panel 34B. For example, the second panel 34B may contact the second seating assembly 14B. In some examples, the first panel 34A and/or the second panel 34B may contact the seatback 22 of the second seating assembly 14B. In some examples, the first panel 34A and/or the second panel 34B may contact the rear-side 22A of the seatback 22 of the second seating assembly 14B. In some examples, the first panel 34A and/or the second panel 34B may contact the seat-base 18 of the second seating assembly 14B. It is contemplated that the first panel 34A and/or the second panel 34B may contact any component of the second seating assembly 14B. In some examples, in which the second seating assembly 14B is in the forwardly folded position, the first panel 34A and/or the second panel 34B may contact the second seating assembly 14B such that a generally planar surface is formed between the first panel 34A and/or the second panel 34B and the rear-side 22A of the seatback 22 of the second seating assembly 14B. In other words, a surface of the first panel 34A and/or the second panel 34B and the rear-side 22A of the seatback 22 of the second seating assembly 14B may be generally parallel and physically coincide.

The method of configuring the seating arrangement in the vehicle 110 includes the step 120 of attaching the first panel 34A and/or the second panel 34B of the panel assembly 34 to the second seating assembly 14B, which is vehicle forward of the first seating assembly 14A via the attachment feature 40. For example, the second panel 34B may be attached to the second seating assembly 14B via the attachment feature 40.

The attachment feature 40 may be coupled to the panel assembly 34. In some embodiments, the attachment feature 40 may be coupled to the first panel 34A and/or the second panel 34B of the panel assembly 34. In some embodiments, the attachment feature 40 may be coupled to the distal end of the first panel 34A and/or the second panel 34B.

The attachment feature 40 may attach to the second seating assembly 14B by attaching to the receiving feature 42 that is coupled to a second seating assembly 14B. The receiving feature 42 may be coupled to any component of the second seating assembly 14B. For example, the receiving feature 42 may be coupled to the seatback 22. In some embodiments, the receiving feature 42 may be coupled to the rear-side 22A of the seatback 22. In some embodiments, the receiving feature 42 may be coupled to the seat-base 18. The attachment feature 40 and/or the receiving feature 42 may be an adhesive, hook and loop (e.g. Velcro®), magnet, tab, clip, hook, snap, tie, zipper, button, and/or a combination thereof. The attachment feature 40 and/or the receiving feature 42 may be a feature configured to engage with an adhesive, hook and loop (e.g. Velcro®), magnet, tab, clip, hook, snap, tie, zipper, button, and/or a combination thereof.

Use of the present disclosure may provide a variety of advantages. First, the first panel 34A and/or the second panel 34B of the panel assembly 34 may conveniently reorient the trunk space of the vehicle 10 by extending to cover the gaps 28 between the rows 16 of seating. In doing so, the panel assembly 34 may extend the storage surface provided by the rear-sides 22A of the folded seatbacks 22. Second, the first panel 34A and/or the second panel 34B may extend to cover the headrest rear-side 32 and may, consequently, prevent cargo from marring the appearance headrest rear-side 32. Third, the attachment feature 40 may attach the panel assembly 34 to the seating assembly 14 vehicle forward of the of the panel assembly 34 and allow the panel assembly 34 to extend and contract as the seating assembly 14 vehicle forward of the panel assembly 34 moves in forward and rearward directions respectively.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle seating assembly comprising:
a seat-base;
a seatback pivotally coupled to the seat-base and operable to a forwardly-folded position that arranges the seatback over the seat-base;
a headrest coupled to the seatback by a connecting feature; and
a panel assembly directly coupled to the connecting feature, wherein the panel assembly slidably extends to a position forward of the headrest when the seatback is in the forwardly-folded position, and wherein the panel assembly is offset from the seatback such that the seatback and the panel assembly are free of overlap in a vertical plane when the seatback is in the forwardly-folded position.

2. The vehicle seating assembly of claim 1, wherein a horizontal centerline of the panel assembly is substantially coplanar with a rearward surface of the seatback.

3. The vehicle seating assembly of claim 1, wherein the panel assembly comprises:
   a first panel, and
   a second panel configured to extend from the first panel.

4. The vehicle seating assembly of claim 3, further comprising:
   a locking feature coupled to the panel assembly that resists at least one of an extension and a contraction of the second panel relative to the first panel.

5. The vehicle seating assembly of claim 3, wherein the second panel is configured to extend telescopically relative to the first panel.

6. The vehicle seating assembly of claim 1, wherein the connecting feature that couples the headrest to the seatback comprises:
   at least one post.

7. The vehicle seating assembly of claim 6, further comprising:
   a snap-fit feature coupling the panel assembly to the at least one post.

8. The vehicle seating assembly of claim 6, further comprising:
   a clip-on feature coupling the panel assembly to the at least one post.

\* \* \* \* \*